US012508819B2

United States Patent
(12) United States Patent
Takahashi et al.

(10) Patent No.: US 12,508,819 B2
(45) Date of Patent: Dec. 30, 2025

(54) THERMAL PRINTER

(71) Applicant: TOSHIBA TEC KABUSHIKI KAISHA, Tokyo (JP)

(72) Inventors: Takahide Takahashi, Tagata Shizuoka (JP); Fumiharu Iwasaki, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 156 days.

(21) Appl. No.: 18/434,264

(22) Filed: Feb. 6, 2024

(65) Prior Publication Data

US 2024/0351348 A1 Oct. 24, 2024

(30) Foreign Application Priority Data

Apr. 19, 2023 (JP) ................................ 2023-068573

(51) Int. Cl.
*B41J 2/355* (2006.01)
*B41J 2/335* (2006.01)

(52) U.S. Cl.
CPC ......... *B41J 2/3551* (2013.01); *B41J 2/33505* (2013.01)

(58) Field of Classification Search
CPC ........ B41J 2/3551; B41J 2/33505; B41J 2/36; B41J 2/355; B41J 29/393; B41J 2/35; B41J 2/32
See application file for complete search history.

(56) References Cited

FOREIGN PATENT DOCUMENTS

| | | | | |
|---|---|---|---|---|
| JP | H10193617 | * | 7/1998 | ................ B41J 2/05 |
| JP | 2008-155491 A | | 7/2008 | |
| JP | 2008-279683 A | | 11/2008 | |
| JP | 6302880 B2 | * | 3/2018 | .............. B41J 2/355 |

OTHER PUBLICATIONS

Extended European Search Report dated Jun. 17, 2024 issued in European Application No. 24159060.3, 5 pages.

* cited by examiner

*Primary Examiner* — Kristal Feggins
(74) *Attorney, Agent, or Firm* — FOLEY & LARDNER LLP

(57) ABSTRACT

A thermal printer includes a thermal head, a drive data generation unit, a clock generation unit, and a drive data supply unit. The thermal head is configured such that a large number of heating elements divided into a plurality of blocks are mounted thereon, and is configured to input drive data for driving the large number of heating elements to the plurality of blocks in parallel in synchronization with a plurality of different first clock signals. The drive data generation unit is configured to generate a plurality of pieces of drive data for each of the plurality of blocks from print data and to output the plurality of pieces of drive data in synchronization with a plurality of second clock signals. The clock generation unit is configured to generate a plurality of clock signals whose phases are shifted from each other. The drive data supply unit is configured to take in the plurality of pieces of drive data, which are output from the drive data generation unit, in synchronization with the plurality of second clock signals and to supply the plurality of pieces of drive data to the thermal head in synchronization with the plurality of first clock signals.

10 Claims, 4 Drawing Sheets

THERMAL PRINTER

CROSS-REFERENCE TO RELATED APPLICATION

This application is based upon and claims the benefit of priority from Japanese Patent Application No. 2023-068573, filed on Apr. 19, 2023, the entire contents of which are incorporated herein by reference.

FIELD

Embodiments described herein relate generally to a thermal printer.

BACKGROUND

A thermal head configured such that a large number of mounted heating elements are divided into blocks, and drive data is input in parallel for each block is known.

In a thermal printer using a thermal head having such a configuration, drive data for driving the heating elements of each block is input to the thermal head in synchronization with the same clock signal.

For this reason, change timings of a plurality of pieces of drive data supplied to the thermal head may coincide with each other, leading to an increase in common-mode noise, which may cause a problem with electromagnetic interference (EMI).

Due to such circumstances, it is desired to reduce common-mode noise.

DETAILED DESCRIPTION

There is provided a thermal printer that can reduce common-mode noise.

In general, according to at least one embodiment, a thermal printer includes a thermal head, a drive data generation unit (drive data generator, a clock generation unit (clock generator), and a drive data supply unit (drive data supply). The thermal head is configured such that a large number of heating elements divided into a plurality of blocks are mounted thereon, and is configured to input drive data for driving the large number of heating elements to the plurality of blocks in parallel in synchronization with a plurality of different first clock signals. The drive data generation unit is configured to generate a plurality of pieces of drive data for each of the plurality of blocks from print data and to output the plurality of pieces of drive data in synchronization with a plurality of second clock signals. The clock generation unit is configured to generate a plurality of clock signals whose phases are shifted from each other as the first clock signals. The drive data supply unit is configured to take in the plurality of pieces of drive data, which are output from the drive data generation unit, in synchronization with the plurality of second clock signals and to supply the plurality of pieces of drive data to the thermal head in synchronization with the plurality of first clock signals generated by the clock generation unit.

An example of at least one embodiment will be described below with reference to the drawings.

Figure 1:
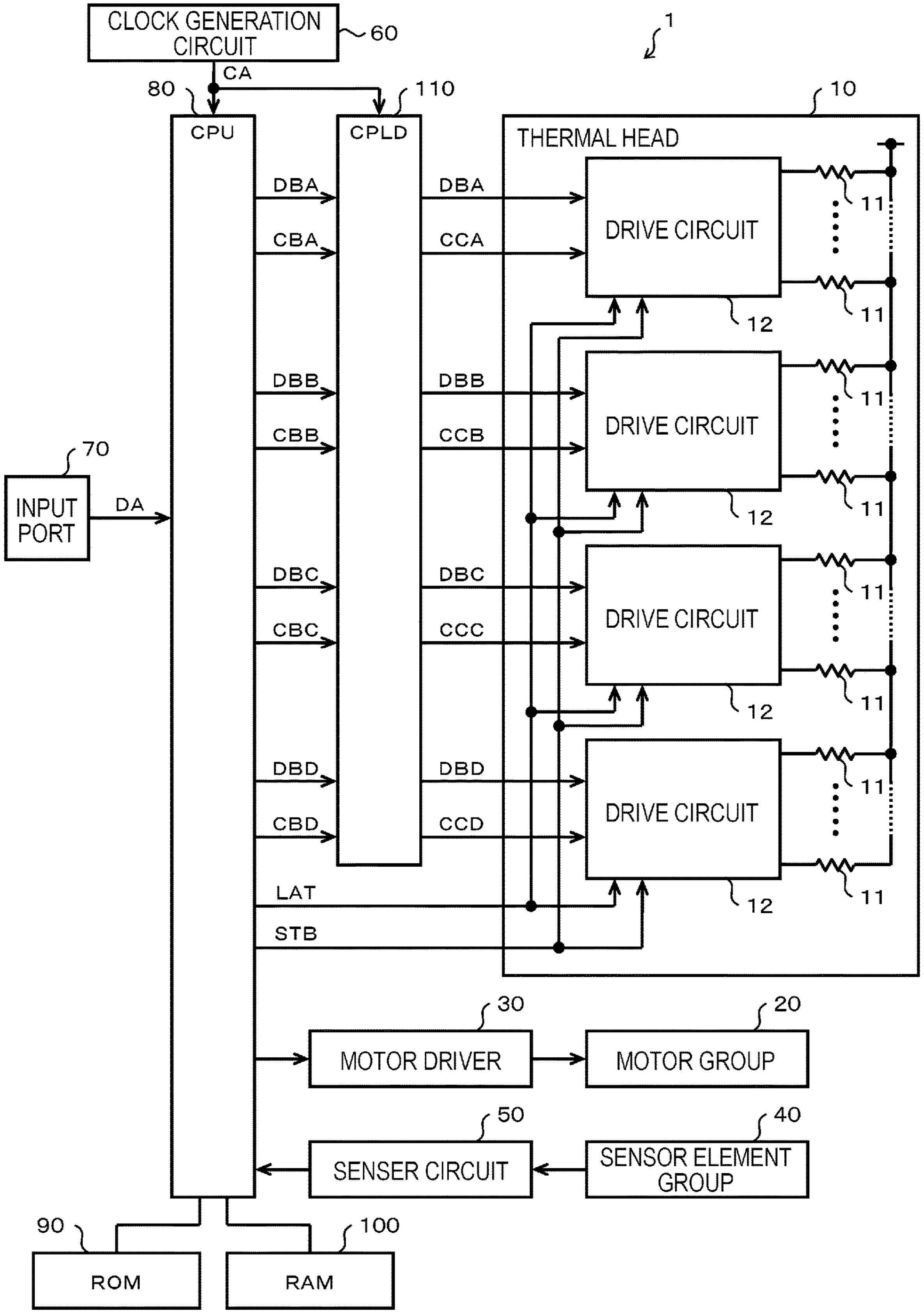
FIG. 1 is a block diagram showing a circuit configuration of main parts of a thermal printer according to at least one embodiment.

FIG. 1 is a block diagram showing a circuit configuration of main parts of a thermal printer 1 according to at least one embodiment.

The thermal printer 1 includes a thermal head 10, a motor group 20, a motor driver 30, a sensor element group 40, a sensor circuit 50, a clock generation circuit 60, an input port 70, a central processing unit (CPU) 80, a read-only memory (ROM) 90, a random-access memory (RAM) 100, and a complex programmable logic device (CPLD) 110.

The thermal head 10 includes a large number of heating elements 11 and four drive circuits 12. All of the large number of heating elements 11 generate heat by applying a current. The large number of heating elements 11 are arranged, for example, in a row at equal intervals. However, the large number of heating elements 11 may be arranged in multiple rows or in a zigzag manner. The large number of heating elements 11 are divided into four groups. The four drive circuits 12 correspond to the four groups of heating elements 11, respectively. The heating elements 11 belonging to the corresponding group are connected to the drive circuit 12. The drive circuit 12 controls application of a current to each of the heating elements 11 belonging to the corresponding group.

The motor group 20 includes a plurality of motors. The motors included in the motor group 20 are power sources for conveying print paper and the like.

The motor driver 30 drives the motors included in the motor group 20 under the control of the CPU 80.

The sensor element group 40 includes various sensor elements for detecting an operating state of the thermal printer 1.

The sensor circuit 50 determines the operating state of the thermal printer 1 based on the state of each of the sensor elements included in the sensor element group 40.

The clock generation circuit 60 generates a system clock signal CA that serves as a reference for an operation timing of the thermal printer 1.

The input port 70 is a port to which a host device is connected and through which print data transmitted from the host device is input. It is assumed that, for example, a well-known communication device based on a universal serial bus (USB) is used as the input port 70.

The CPU 80 generates four pieces of drive data DBA, DBB, DBC, and DBD for driving the thermal head 10 from the print data that is input through the input port 70. The CPU 80 outputs the drive data DBA, DBB, DBC, and DBD together with clock signals CBA, CBB, CBC, and CBD in synchronization with the clock signals CBA, CBB, CBC, and CBD having different timings. The pieces of drive data DBA, DBB, DBC, and DBD correspond to the four groups of heating elements 11, respectively, and are supplied to the drive circuits 12 corresponding to the same groups via the CPLD 110.

The CPU 80 outputs a latch signal LAT for giving an instruction for a timing at which the drive data DBA, DBB, DBC, and DBD are latched to each of the drive circuits 12 and a strobe signal STB for giving an instruction for a timing at which a current is applied to the heating elements 11 to each of the four drive circuits 12.

The CPU 80 outputs the drive data DBA, DBB, DBC, and DBD, the latch signal LAT, and the strobe signal STB and controls the motor driver 30 in order to execute a necessary print operation while referring to the operating state determined by the sensor circuit 50.

The ROM 90 stores various types of software that describe a processing procedure of the CPU 80 and various types of data to be referred to by the CPU 80 at the time of executing various types of information processing.

The RAM 100 temporarily stores data used if the CPU 80 executes various types of information processing.

The CPLD 110 is programed to constitute a logic circuit for generating clock signals CCA, CCB, CCC, and CCD to be described later and supplying the drive data DBA, DBB, DBC, and DBD to the thermal head 10 in synchronization with the clock signals CCA, CCB, CCC, and CCD.

Next, an operation of the thermal printer 1 configured as described above will be described.

An operation of printing an image using the thermal printer 1 may be basically the same as that of other existing thermal printers of the same type. An operation of the thermal printer 1 which is different from those of other existing thermal printers is the supply of the drive data DBA, DBB, DBC, and DBD to the thermal head 10, which will be described below.

Figure 2:
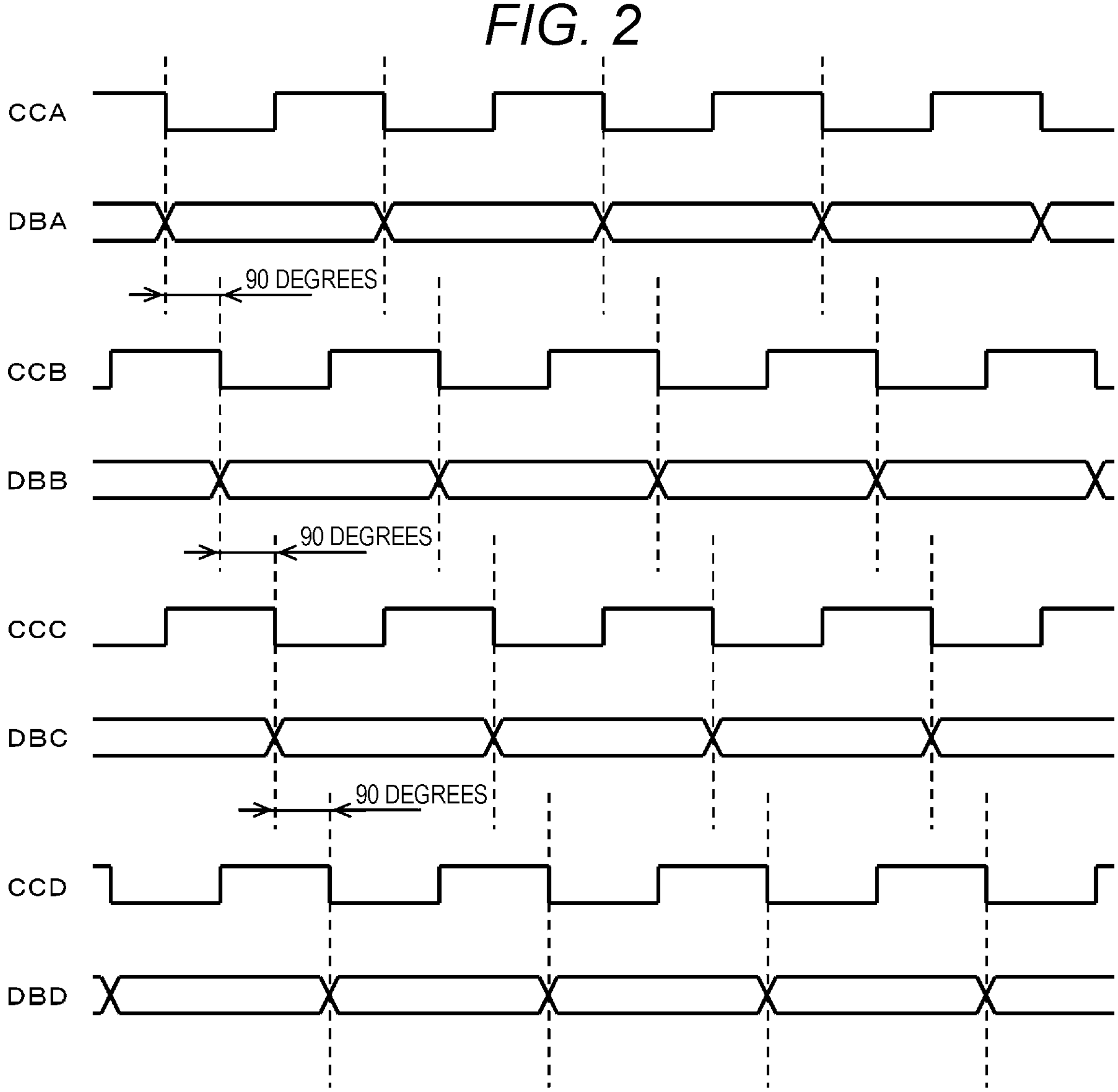
FIG. 2 is a timing diagram of outputs of a CPLD in FIG. 1.

FIG. 2 is a timing diagram of outputs of the CPLD 110.

The CPLD 110 generates the clock signals CCA, CCB, CCC, and CCD whose phases are shifted by 90 degrees from each other, as shown in FIG. 2, based on the system clock signal CA.

The CPLD 110 takes in the drive data DBA output from the CPU 80 in synchronization with the clock signal CBA, buffers the drive data DBA, and outputs the drive data DBA to one of the drive circuits 12 in synchronization with the clock signal CCA. The drive circuit 12 receiving the drive data DBA and the clock signal CCA takes in the drive data DBA in synchronization with the clock signal CCA.

The CPLD 110 takes in the drive data DBB output from the CPU 80 in synchronization with the clock signal CBB, buffers the drive data DBB, and outputs the drive data DBB to one of the drive circuits 12 in synchronization with the clock signal CCB. The drive circuit 12 receiving the drive data DBB and the clock signal CCB takes in the drive data DBB in synchronization with the clock signal CCB.

The CPLD 110 takes in the drive data DBC output from the CPU 80 in synchronization with the clock signal CBC, buffers the drive data DBC, and outputs the drive data DBC to one of the drive circuits 12 in synchronization with the clock signal CCC. The drive circuit 12 receiving the drive data DBC and the clock signal CCC takes in the drive data DBC in synchronization with the clock signal CCC.

The CPLD 110 takes in the drive data DBD output from the CPU 80 in synchronization with the clock signal CBD, buffers the drive data DBD, and outputs the drive data DBD to one of the drive circuits 12 in synchronization with the clock signal CCD. The drive circuit 12 receiving the drive data DBD and the clock signal CCD takes in the drive data DBD in synchronization with the clock signal CCD.

Each of the four drive circuits 12 latches the taken-in drive data in synchronization with the latch signal LAT. Each of the four drive circuits 12 controls application of a current to the corresponding heating element 11 in synchronization with the strobe signal STB based on the drive data latched in this manner.

As described above, the clock signals CBA, CBB, CBC, and CBD correspond to a plurality of first clock signals, and the clock signals CCA, CCB, CCC, and CCD correspond to a plurality of second clock signals. The CPU 80 also has a function as a drive data generation unit. The CPLD 110 has functions as a clock generation unit and a drive data supply unit.

Figure 3:
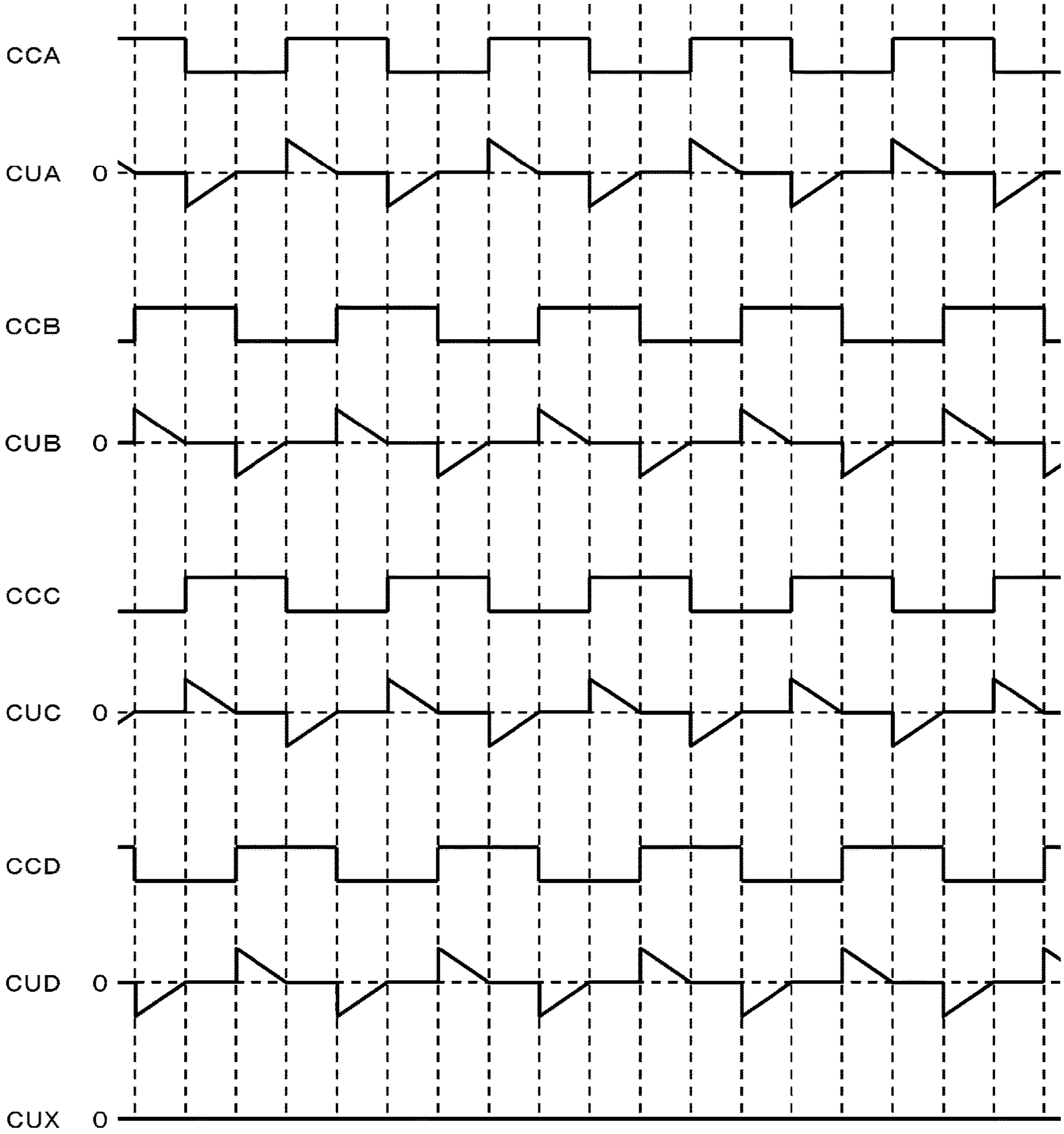
FIG. 3 is a diagram showing the state of fluctuations in a power supply current due to fluctuations in clock signals in at least one embodiment.

FIG. 3 is a diagram showing the state of fluctuations in a power supply current due to fluctuations in the clock signals CCA, CCB, CCC, and CCD. However, the state of fluctuations in the power supply current shown in FIG. 3 only represents the outline of a tendency of fluctuations, and minute fluctuations are not illustrated.

Fluctuations in a power supply current due to fluctuations in the clock signal CCA are as in a current CUA shown in FIG. 3. Fluctuations in a power supply current due to fluctuations in the clock signal CCB are as in a current CUB shown in FIG. 3. Fluctuations in a power supply current due to fluctuations in the clock signal CCC are as in a current CUC shown in FIG. 3. Fluctuations in a power supply current due to fluctuations in the clock signal CCD are as in a current CUD shown in FIG. 3. However, the actual fluctuation in a power supply current CUX is a combination of these currents CUA, CUB, CUC, and CUD, and theoretically becomes zero as shown in FIG. 3. However, actually, the power supply current CUX does not become completely zero due to errors in change timings and signal levels of the clock signals CCA, CCB, CCC, and CCD, but it can be sufficiently reduced.

Figure 4:
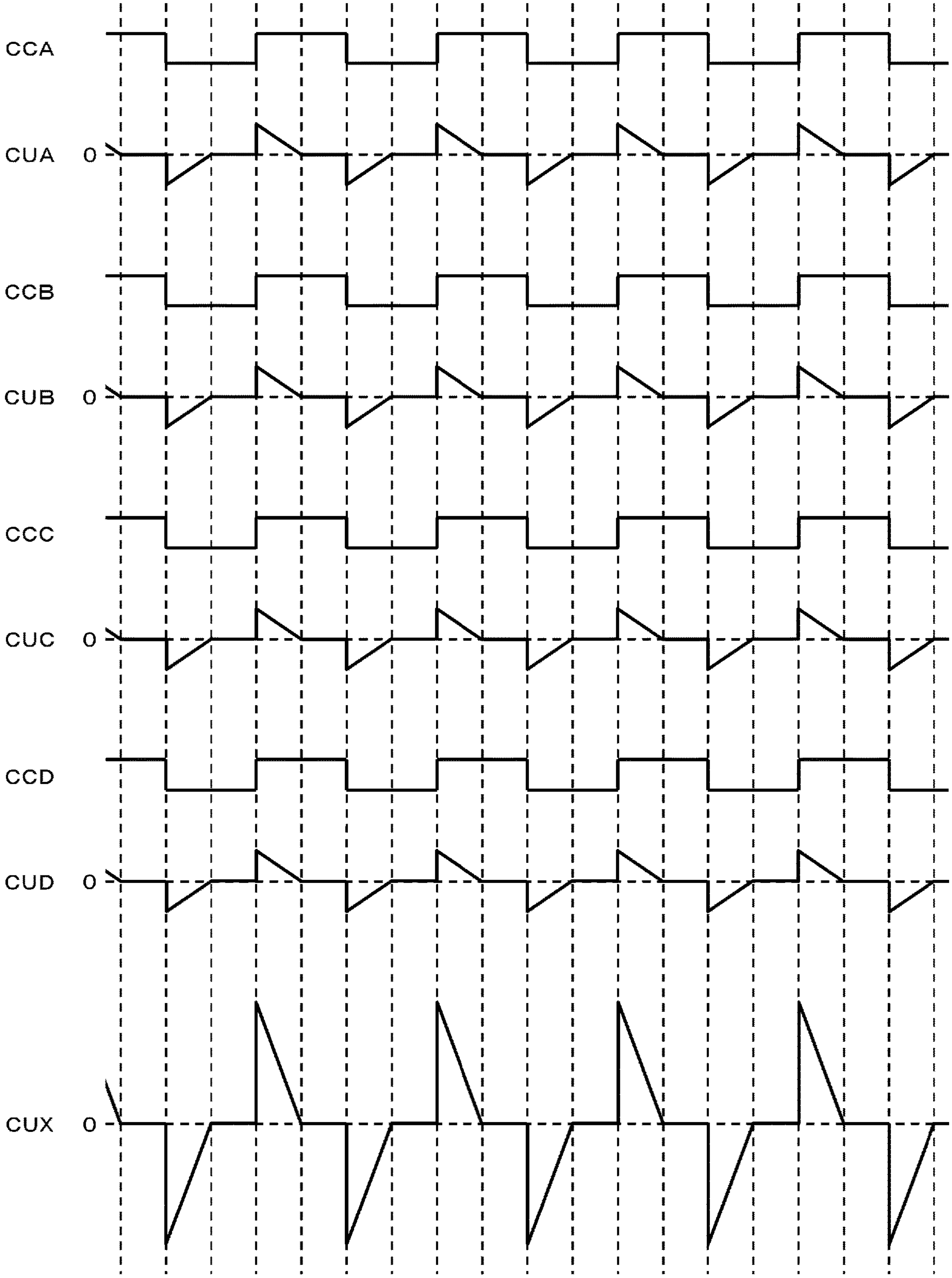
FIG. 4 is a diagram showing the state of fluctuations in a power supply current if clock signals fluctuate at the same timing.

FIG. 4 is a diagram showing the state of fluctuations in a power supply current if the clock signals CCA, CCB, CCC, and CCD fluctuate at the same timing. However, the state of fluctuations in the power supply current shown in FIG. 4 represents the outline of a tendency of fluctuations, and minute fluctuations are not illustrated.

As shown in FIG. 4, if the clock signals CCA, CCB, CCC, and CCD fluctuate at the same timing, fluctuations in the power supply current CUX become significantly large, and it can be understood that fluctuations in the power supply current CUX can be significantly reduced in the embodiment.

Thus, according to the thermal printer 1, it is possible to reduce common-mode noise.

In the thermal printer 1, a phase difference between the clock signals CCA, CCB, CCC, and CCD is set to 90°, which is obtained by 4/360 because the number of groups of the heating elements 11 is four. Thereby, as described above, fluctuations in the power supply current CUX can be logically set to zero, and common-mode noise can be minimized.

This embodiment can be modified in various ways as follows.

The number of groups of the heating elements 11 may be any integer equal to or greater than 2.

If the number of groups of the heating elements 11 is expressed as n, it is desirable that a phase difference between n clock signals be set to be an angle obtained by n/360 as in the above-described embodiment. However, if the n clock signals have a phase difference, it is possible to reduce common-mode noise as compared to a case where there is no phase difference, and thus a phase difference of an angle different from an angle obtained by n/360 may be provided.

The functions implemented by the CPLD 110 can be partially or entirely implemented by hardware that executes processing that is not based on a program, such as a logic circuit.

While certain embodiments have been described, these embodiments have been presented by way of example only, and are not intended to limit the scope of the disclosure. Indeed, the novel embodiment described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A thermal printer comprising:

a thermal head arranged such that a large number of heating elements divided into a plurality of blocks are mounted on the thermal head, the thermal head configured to input drive data for driving the large number of heating elements to the plurality of blocks in parallel in synchronization with a plurality of different first clock signals;

a drive data generator configured to:

generate a plurality of pieces of drive data for each of the plurality of blocks from print data, and output the plurality of pieces of drive data in synchronization with a plurality of second clock signals;

a clock generator configured to generate a plurality of clock signals whose phases are shifted from each other as the first clock signals; and a drive data supply configured to:

take in the plurality of pieces of drive data, which are output from the drive data generator, in synchronization with the plurality of second clock signals, and supply the plurality of pieces of drive data to the thermal head in synchronization with the plurality of first clock signals generated by the clock generator.

2. The printer according to claim 1, wherein the large number of heating elements divided into n (n is an integer) blocks are mounted on the thermal head, and the clock generator is configured to generate n first clock signals whose phases are different by 360/n degrees.

3. The printer according to claim 1, wherein the large number of heating elements are arranged in a row in equal intervals.

4. The printer according to claim 1, wherein the large number of heating elements are arranged in multiple rows or in a zigzag manner.

5. The printer according to claim 1, wherein a number of groups of the heating elements may be any integer equal to or greater than 2.

6. A method of operating a thermal printer, the thermal printed comprising:

a thermal head arranged such that a large number of heating elements divided into a plurality of blocks are mounted on the thermal head, the thermal head configured to input drive data for driving the large number of heating elements to the plurality of blocks in parallel in synchronization with a plurality of different first clock signals, the method comprising:

generating a plurality of pieces of drive data for each of the plurality of blocks from print data;

outputting the plurality of pieces of drive data in synchronization with a plurality of second clock signals;

generating a plurality of clock signals whose phases are shifted from each other as the first clock signals;

taking in the plurality of pieces of drive data, which are output, in synchronization with the plurality of second clock signals; and supplying the plurality of pieces of drive data to the thermal head in synchronization with the plurality of first clock signals generated by the clock generator.

7. The method according to claim 6, wherein the large number of heating elements divided into n (n is an integer) blocks are mounted on the thermal head, and further comprising generating n first clock signals whose phases are different by 360/n degrees.

8. The method according to claim 6, wherein the large number of heating elements are arranged in a row in equal intervals.

9. The method according to claim 6, wherein the large number of heating elements are arranged in multiple rows or in a zigzag manner.

10. The method according to claim 6, wherein a number of groups of the heating elements may be any integer equal to or greater than 2.

* * * * *